(12) United States Patent
Gambini et al.

(10) Patent No.: US 8,611,755 B2
(45) Date of Patent: Dec. 17, 2013

(54) OPTICAL TRANSMITTER WITH HYBRIDLY INTEGRATED DRIVER

(75) Inventors: Piero Gambini, Turin (IT); Mario Puleo, Borgosesia (IT)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 279 days.

(21) Appl. No.: 13/015,311

(22) Filed: Jan. 27, 2011

(65) Prior Publication Data

US 2012/0195601 A1   Aug. 2, 2012

(51) Int. Cl.
*H04B 10/00* (2013.01)

(52) U.S. Cl.
USPC ............................................. 398/139; 398/138

(58) Field of Classification Search
USPC .................................... 398/138, 139
See application file for complete search history.

(56) References Cited

U.S. PATENT DOCUMENTS

| | | | |
|---|---|---|---|
| 5,204,806 A * | 4/1993 | Sasaki et al. ................. | 361/749 |
| 5,774,614 A | 6/1998 | Gilliland et al. | |
| 6,665,191 B2 * | 12/2003 | Blood et al. .................. | 361/749 |
| 6,863,453 B2 | 3/2005 | Wang et al. | |
| 7,066,659 B2 | 6/2006 | Aronson et al. | |
| 7,176,436 B2 | 2/2007 | Zheng et al. | |
| 7,215,557 B2 * | 5/2007 | Glovatsky et al. ............ | 361/804 |
| 7,275,937 B2 * | 10/2007 | Ellison ............................ | 439/67 |
| 7,311,240 B2 * | 12/2007 | Nippa et al. ................. | 228/180.1 |
| 7,322,754 B2 * | 1/2008 | Wolf et al. ...................... | 385/93 |
| 7,439,449 B1 * | 10/2008 | Kumar et al. .................. | 174/254 |
| 7,446,261 B2 * | 11/2008 | Kumar et al. .................. | 174/254 |
| 7,496,251 B2 | 2/2009 | Cohen et al. | |
| 7,526,207 B2 * | 4/2009 | Aronson et al. ............. | 398/164 |
| 7,945,169 B2 * | 5/2011 | Oki et al. ...................... | 398/135 |
| 7,970,283 B2 * | 6/2011 | Giaretta et al. ............... | 398/135 |
| 8,057,109 B2 * | 11/2011 | Flens et al. ..................... | 385/92 |
| 8,195,295 B2 * | 6/2012 | Stevenson et al. ............. | 607/36 |
| 2006/0032665 A1 * | 2/2006 | Ice ................................. | 174/254 |
| 2006/0062526 A1 * | 3/2006 | Ikeuchi ........................... | 385/88 |
| 2007/0053392 A1 | 3/2007 | Moto | |
| 2009/0023398 A1 * | 1/2009 | Boyle .......................... | 455/90.2 |
| 2010/0080567 A1 | 4/2010 | McColloch et al. | |

* cited by examiner

*Primary Examiner* — Agustin Bello

(57) ABSTRACT

An optical transmitter includes a transmitter optical subassembly (TOSA) having a transistor outline (TO) package, a flexible circuit, and at least one active electronic device mounted on the flexible circuit. The active electronic device includes circuitry for processing signals communicated to and from the TOSA.

7 Claims, 3 Drawing Sheets

OPTICAL TRANSMITTER WITH HYBRIDLY INTEGRATED DRIVER

BACKGROUND

In optical communications networks, optical transceiver modules are used to transmit and receive optical signals over optical fibers. As illustrated in FIG. 1, a transmitter optical subassembly (TOSA) 10 is commonly housed within such an optical transceiver module (not shown). The TOSA 10 includes a laser diode that is driven with electrical signals representing data to be transmitted. In response to the electrical signals, the laser produces amplitude modulated optical signals that represent the data. The optical signals are emitted from an emitting end or receptacle end 12 of TOSA 10. The optical signals can be transmitted over an optical fiber (not shown) that is mated with receptacle end 12 of TOSA 10. The TOSA 10 can also include a photodiode that monitors the output of the laser diode to aid feedback control of the laser diode.

The end of TOSA 10 opposite receptacle end 12 commonly includes a transistor outline (TO) package or TO-can 14. (For purposes of clarity, TO-can 14 is not shown in its entirety but rather is shown housed within an outer portion or barrel of TOSA 10.) A TO-can 14 provides an economical way to hermetically package the laser diode (not shown) and the monitoring photodiode (not shown). The laser diode and photodiode can be formed in respective semiconductor dies that are attached to a substrate of a submount assembly inside TO can 14. Other components such as discrete electrical components and optical elements are typically also attached to the submount assembly substrate inside TO-can 14. The TO-can 14 commonly includes a cylindrical cap and a header 16, to which the cylindrical metal cap is hermetically attached. After the laser diode die and other components have been attached to the substrate, the leads of the die are wire bonded to conductors formed in the submount assembly substrate. These conductors are then wire bonded to corresponding electrical contact pins 18 that extend through header 16 to the exterior of TOSA 10.

As illustrated in FIG. 2, a printed circuit board assembly 20, which can also be housed along with TOSA 10 within the optical transceiver housing (not shown), processes electrical signals that are communicated to and from TOSA 10. Printed circuit board assembly 20 can include one or more integrated circuit packages 22 and other electronic devices 23, such as discrete circuit elements that can include resistors, capacitors, transistors, etc. (not shown), mounted on a printed circuit board 24. A flexible circuit 26 can convey the electrical signals between TOSA 10 and printed circuit board assembly 20. More specifically, a first end of flexible circuit 26 can be attached to header 16 by placing it flat against header 16 such that pins 18 extend through holes in flexible circuit 26, and soldering pins 18 to conductive pads surrounding the holes. A second end of flexible circuit 26 can be attached to printed circuit board 24 by soldering conductive fingers 28 of flexible circuit 26 to corresponding pads on printed circuit board 24. Flexible circuit 26 includes conductive traces 30 that extend from the pads surrounding the holes at the first end of flexible circuit 26 to corresponding ones of conductive fingers 28 at the second end of flexible circuit 26. Elements of the processing circuitry of printed circuit board assembly 20 receive input signals from an external system (not shown) and generate signals for biasing and otherwise driving the laser diode. Some of conductive traces 30 convey the generated signals to TOSA 10, where they are provided to the laser diode via some of pins 18. Signals produced by the monitoring photodiode in TOSA 10 are provided by others of pins 18 to others of conductive traces 30, which convey the produced signals to printed circuit board assembly 20. Other elements of the processing circuitry of printed circuit board assembly 20 receive these signals produced by the photodiode and process them by, for example, detecting a current. As a result of processing the photodiode signals, the processing circuitry of printed circuit board assembly 20 can adjust the signals generated for driving the laser diode, in a feedback control manner. Although the processing circuitry is essentially entirely located on printed circuit board assembly 20 in this type of transceiver, in at least one instance a small inductor has been mounted on the flexible circuit 26.

Although the above-described transmitter configuration in which a TOSA is coupled to processing circuitry on a printed circuit board via a flexible circuit is common, other configurations are known. For example, in another transmitter configuration the processing circuitry and the laser are co-packaged within a module.

SUMMARY

Embodiments of the present invention relate to an optical transmitter that includes a transmitter optical subassembly (TOSA) having a receptacle end and a package end, a flexible circuit, and one or more active electronic devices mounted on the flexible circuit. The package end contains at least one opto-electronic device, such as laser, and has two or more TOSA electrical contacts. A first end of the flexible circuit is attached to the TOSA electrical contacts. A second end of the flexible circuit is attachable to a circuit board. Some of the conductive traces of the flexible circuit couple the one or more electronic devices that are mounted on the flexible circuit with corresponding ones of the TOSA electrical contacts. Others of the conductive traces of the flexible circuit couple the one or more electronic devices that are mounted on the flexible circuit with the circuit board. The one or more electronic devices process signals communicated between the circuit board and the laser or other opto-electronic device in the TOSA.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 3:
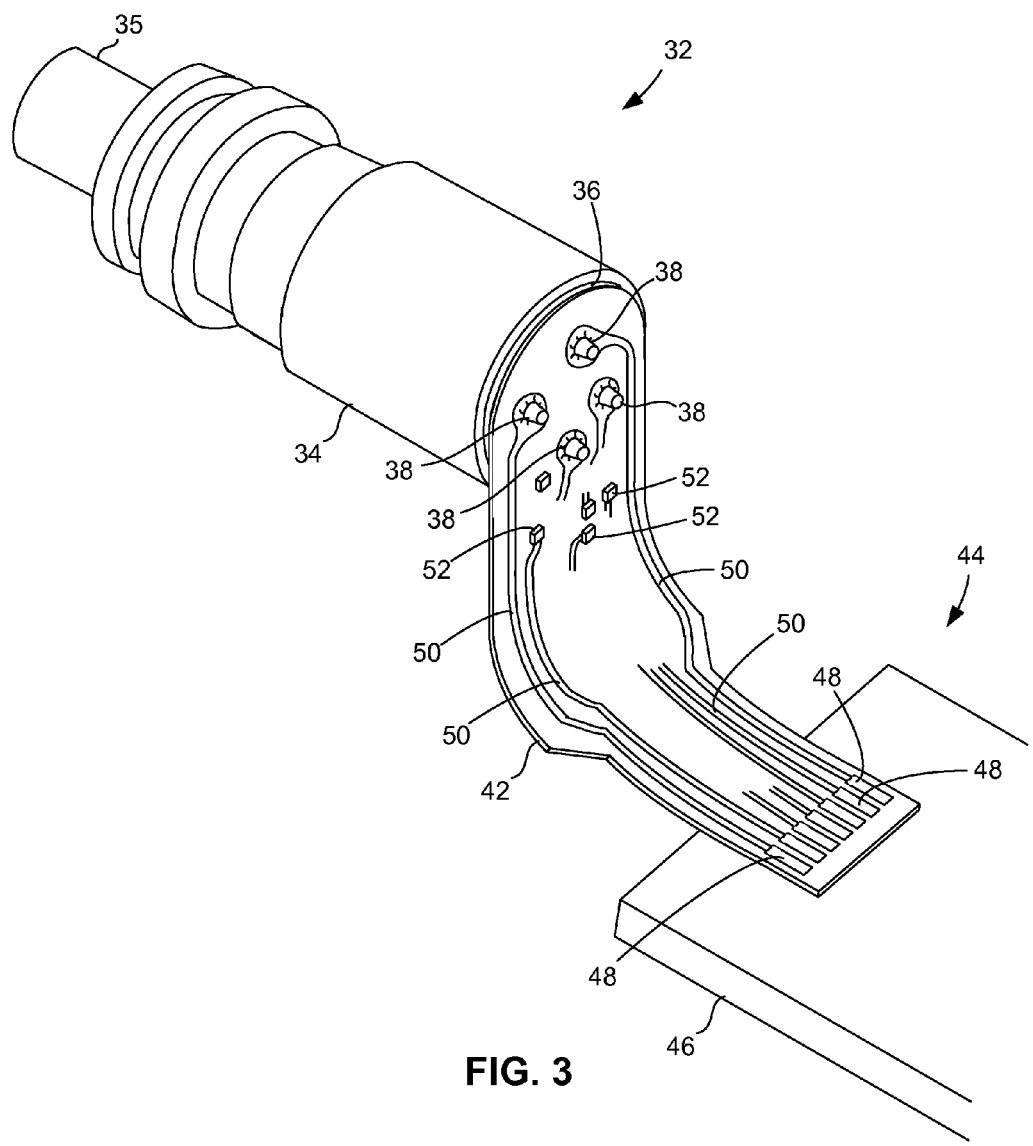
FIG. 3 is a perspective view of an optical transmitter, in accordance with an exemplary embodiment of the invention.
Figure 4:
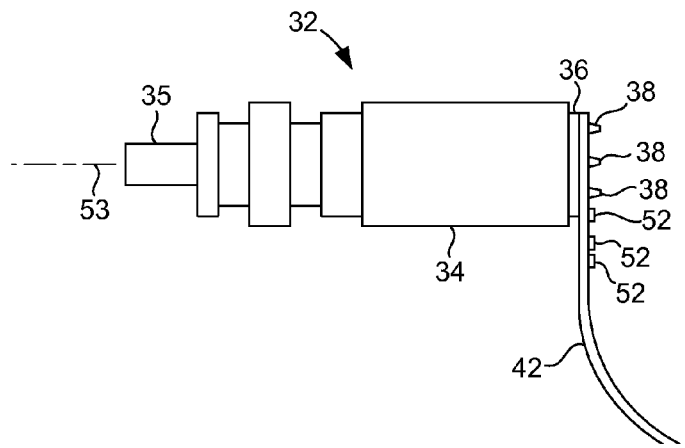
FIG. 4 is a side elevation view of the optical transmitter of FIG. 3
Figure 5:
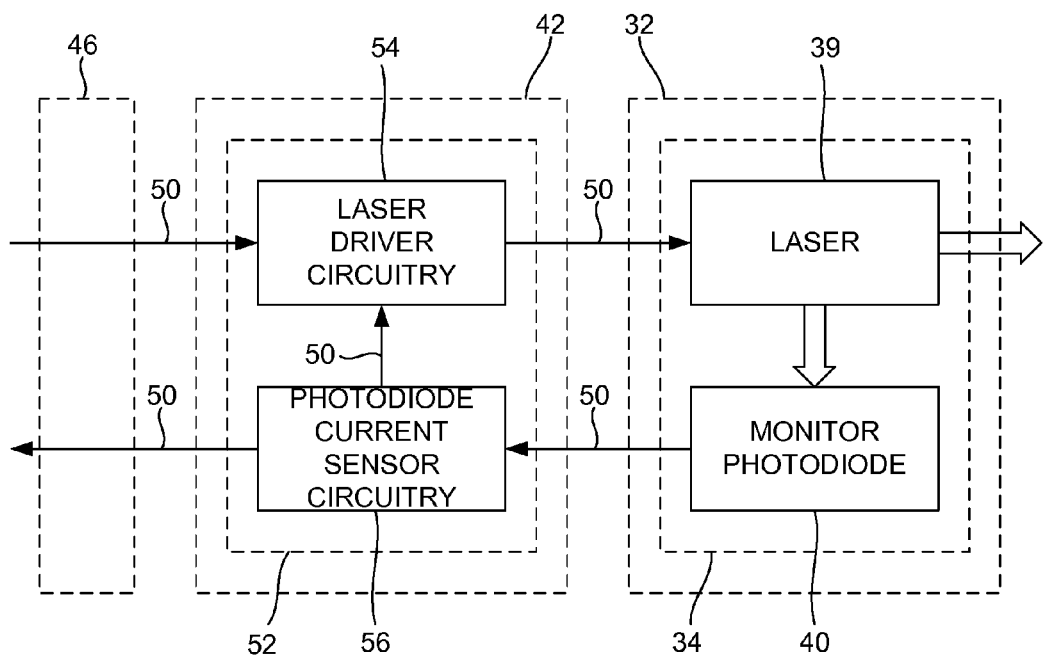
FIG. 5 is a block diagram of the optical transmitter of FIG. 3.

As illustrated in FIGS. 3-5, in an illustrative or exemplary embodiment of the invention, a transmitter optical subassembly (TOSA) 32 includes a transistor outline (TO) package or TO-can 34 at the end of TOSA 32 opposite the receptacle end 35 from which optical signals are emitted. The TO-can 34 includes a header 36 and electrical contact pins 38 that extend through header 36 to the exterior of TOSA 32. The TO-can 34 and its header 36 can be of a conventional type. For example, TO-can 34 and its header 36 can conform to a well-known standard such as TO-46, TO-56, TO-38, etc. As the structure and function of TO-can 34 are well understood in the art, these aspects are not described herein in further detail. It should be understood, however, that TO-can 34 of TOSA 32 includes a laser 39 and a monitor photodiode 40, as illustrated in FIG. 5. Although in the exemplary embodiment TO-can 34 includes both laser 39 and monitor photodiode 40, in other embodiments such a TO-can can include only one such opto-electronic device or can include other types of opto-electronic devices.

A flexible circuit 42 interconnects TOSA 32 with a printed circuit board assembly 44. More specifically, a first end of flexible circuit 42 is attached to header 36 by placing it flat against header 36 such that electrical contact pins 38 extend through holes in flexible circuit 36, and soldering pins 38 to conductive pads on the surface of flexible circuit 36 surrounding the holes. A second end of flexible circuit 36 can be attached to a printed circuit board 46 of printed circuit board assembly 44 by soldering conductive fingers 48 at a second end of flexible circuit 42 to corresponding pads on printed circuit board 46. Flexible circuit 42 includes conductive traces 50 that extend from the pads surrounding the holes at the first end of flexible circuit 42 to corresponding ones of conductive fingers 48 at the second end of flexible circuit 26.

Electronic devices 52, which can include active devices such as surface-mount integrated circuit devices and passive devices such discrete circuit elements (e.g., resistors, capacitors, transistors, etc.), are mounted on flexible circuit 42. Electronic devices 52 can be mounted on a portion of flexible circuit 42 that lies parallel with the surface of header 36 and thus remains substantially flat. Note that the first end of flexible circuit 42 rests against the surface of header 36 and is thus maintained in a flat state, but farther from the first end flexible circuit 42 begins to bend or flex toward the surface of printed circuit board 46. Note that the optical axis 53 along which light is emitted from TOSA 32 is normal to the first end of flexible circuit 42. Mounting electronic devices 52 near the first end of flexible circuit 42, i.e., on the portion that is substantially flat or parallel with the surface of header 36, can minimize stress on electronic devices 52 and their corresponding electrical connections with flexible circuit 42. In other embodiments (not shown), a stiffener can be attached to the back surface of flexible circuit 42 to help maintain the portion of flexible circuit 42 on which electronic devices 52 are mounted in a substantially flat state.

As illustrated in FIG. 5, electronic devices 52 can define some or all of the processing circuitry involved in controlling laser 39. More specifically, electronic devices 52 can include laser driver circuitry 54 and photodiode current sensor circuitry 56. Some of conductive traces 50 of flexible circuit 42 connect laser driver circuitry 54 to some of electrical contact pins 38, which in turn are connected to laser 39 by conductive paths internal to TO-can 34. Others of conductive traces 50 connect photodiode current sensor circuitry 56 to others of electrical contact pins 38, which in turn are connected to monitor photodiode 40 by conductive paths internal to TO-can 34. Thus, conductive traces 50 electrically interconnect circuit board 46, electronic devices 52, and electrical contact pins 38, and electronic devices process 52 signals communicated between circuit board 46 and the opto-electronic devices (i.e., laser 39 and monitor photodiode 40). For purposes of clarity, not all of these interconnections are shown in FIG. 3. Not only portions of some of conductive traces 50 not shown for purposes of clarity, but there can be additional conductive traces 50 on the back or reverse side of flexible circuit 42 or on an intermediate layer of flexible circuit 42 between the front and back layers.

Figure 1:
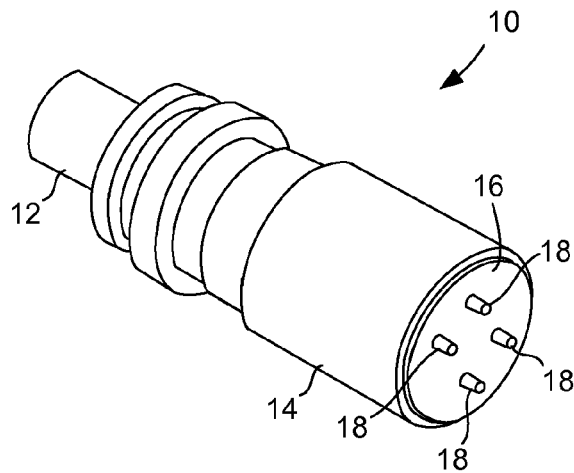
FIG. 1 is a perspective view of a transmitter optical subassembly (TOSA), in accordance with the prior art.
Figure 2:
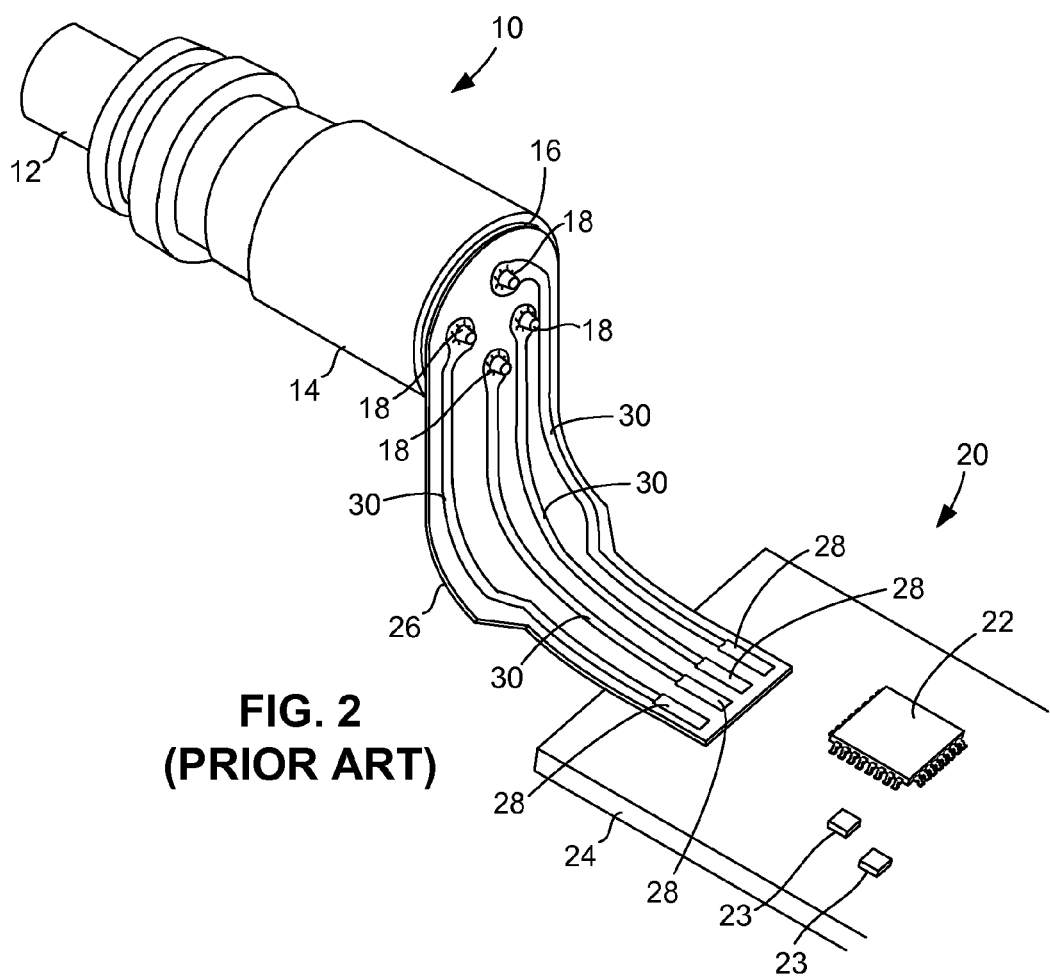
FIG. 2 is a perspective view of an optical transmitter in which the TOSA of FIG. 1 is coupled to a circuit board by a flexible circuit.

In operation, two or more of conductive traces 50 convey electrical signals from circuit board 46 to the one or more electronic devices 52 that define laser driver circuitry 54. The one or more electronic devices 52 that define laser driver circuitry 54 process the electrical signals into laser driving signals. As such driver circuitry is well understood in the art it is not described in further detail herein. Two or more others of conductive traces 50 convey the laser driving signals to corresponding ones of electrical contact pins 38. The laser driving signals are conveyed from electrical contact pins 38 to laser 39 by conductive paths internal to TO-can 34 in the conventional manner. Laser 39 emits optical signals in response to and corresponding to the driving signals. The optical signals are emitted from receptacle end 35 of TOSA 32. The relatively short distance between laser 39 and the one or more electronic devices 52 that produce the laser driver signals helps to minimize impedance mismatch and thus promote good performance at high frequencies. Note that although laser 39 is not shown in FIGS. 3-4, laser 39 is immediately behind header 36 and thus substantially adjacent to the one or more electronic devices 52 that produce the laser driver signals. Also note that in a conventional TOSA 10 (FIG. 1), the electronic devices that produce the laser driver signals are not packaged inside TO-can 14 but rather are mounted on printed circuit board assembly 20 for a number of reasons, including that the electronic devices can emit enough heat to be detrimental to TO-can 14 and that a typical conventional TO-can 14 lacks a sufficient number of contact pins. Thus, in the embodiment illustrated in FIGS. 3-4, electronic devices 52 are mounted sufficiently far from laser 39 to inhibit heat transfer to TO-can 34 yet close enough to laser 39 to help minimize impedance mismatch and thus promote good performance at high frequencies.

Monitor photodiode 40 monitors the output of laser 39 inside TO-can 34 in the conventional manner, producing photodiode feedback signals. The laser driving signals are conveyed to some of electrical contact pins 38 by conductive paths internal to TO-can 34. Two or more others of conductive traces 50 convey the photodiode feedback signals from these ones of electrical contact pins 38 to the one or more electronic devices 52 that define photodiode current sensor circuitry 56. Photodiode current sensor circuitry 56 processes the photodiode feedback signals by producing sensing signals that correspond to the output (current) produced by monitor photodiode 40. Photodiode current sensor circuitry 56 can provide the sensing signals to laser driver circuitry 54 through some of conductive traces 50 as feedback for controlling laser 39. Alternatively, or in addition, still other conductive traces 50 can convey the photodiode sensing signals from photodiode current sensor circuitry 56 to circuit board 46.

Although in the above-described embodiment TOSA 32 includes a transistor outline package or TO-can 34, in other embodiments a TOSA can include any other suitable type of package in which the laser or other opto-electronic device is housed. For example, in other embodiments a TOSA can include a type of package known as a XMD. A TOSA having an XMD package is similar to the above-described TOSA 32 except that the flexible circuit extends away from the header in a direction parallel to the optical axis of the TOSA rather than perpendicular or normal to the optical axis (i.e., parallel to the TO-can header) as in the above-described embodiment.

One or more illustrative or exemplary embodiments of the invention have been described above. However, it is to be understood that the invention is defined by the appended claims and is not limited to the specific embodiments described.

What is claimed is:

1. An optical transmitter, comprising:
a transmitter optical subassembly (TOSA) having a receptacle end and a package end, the package end comprising a transistor outline (TO) package having a TO header, the package end having a plurality of TOSA electrical contacts and containing at least one opto-electronic device having an optical axis normal to the TO header;
a flexible circuit having a first end attached to the TO header of the TOSA and a second end attachable to a circuit board; and
at least one active electronic device mounted on a portion of the flexible circuit at the first end, the portion being adjacent to the TO header, the portion abutting and lying against the TO header, the portion being parallel to the TO header, the optical axis being normal to the portion, wherein conductive traces of the flexible circuit electrically interconnect the circuit board, the at least one electronic device, and the plurality of TOSA electrical contacts, and the at least one active electronic device processes signals communicated between the circuit board and the at least one opto-electronic device.

2. The optical transmitter claimed in claim 1, wherein:
at least one opto-electronic device comprises a laser; and
the at least one active electronic device comprises laser driver circuitry.

3. The optical transmitter claimed in claim 2, wherein the at least one active electronic device further comprises photodiode current sensor circuitry.

4. A method of operation of an optical transmitter, the optical transmitter comprising a transmitter optical subassembly (TOSA) having a receptacle end and a package end having a TO header, a flexible circuit, and at least one active electronic device mounted on a portion of the flexible circuit attached to the TO header, the portion being adjacent to the TO header, the portion abutting and lying against the TO header, the portion being parallel to the TO header, the package end of the TOSA having a plurality of TOSA electrical contacts and containing at least one opto-electronic device having an optical axis normal to the TO header, the optical axis being normal to the portion, the flexible circuit having a first end attached to the TOSA electrical contacts, the method comprising:
a plurality of first conductive traces of the flexible circuit conveying first electrical signals from a circuit board attached to a second end of the flexible circuit to the at least one electronic device mounted on the flexible circuit;
the at least one active electronic device mounted on the flexible circuit processing the first electrical signals;
a plurality of second conductive traces of the flexible circuit conveying second electrical signals from the at least one electronic device to a plurality of first ones of the TOSA electrical contacts, wherein the at least one opto-electronic device receives the second electrical signals via the TOSA electrical contacts.

5. The method claimed in claim 4, wherein the second electrical signals are laser driving signals, and the step of the at least one electronic device mounted on the flexible circuit processing the first electrical signals comprises producing laser driving signals in response to the first electrical signals.

6. The method claimed in claim 4, wherein the at least one electronic device mounted on the flexible circuit further comprises photodiode current sensor circuitry, and wherein the method further comprises:
a plurality of third conductive traces of the flexible circuit conveying third electrical signals from a plurality of second ones of the TOSA electrical contacts to the photodiode current sensor circuitry; and
the photodiode current sensor circuitry processing the third electrical signals.

7. An optical transmitter, comprising:
a transmitter optical subassembly (TOSA) having a transistor outline (TO) package, the TO package containing a laser and a photodiode and having a TO header, a first plurality of TOSA electrical contacts electrically coupled to the laser, and a second plurality of TOSA electrical contacts electrically coupled to the photodiode, the laser and photodiode having respective optical axes normal to the TO header;
a flexible circuit having a first end attached to the TO header of the TOSA and a second end attachable to a circuit board; and
laser driver circuitry mounted on a portion of the flexible circuit at the first end, the portion abutting and lying against the TO header, the portion being adjacent to the TO header and parallel to the TO header, the optical axes being normal to the portion; and
photodiode current sensor circuitry mounted on the flexible circuit;
wherein a first plurality of conductive traces of the flexible circuit electrically interconnect the laser driver circuitry, the first plurality of TOSA electrical contacts and the circuit board, and a second plurality of conductive traces of the flexible circuit electrically interconnect the photodiode current sensor circuitry and the second plurality of TOSA electrical contacts.

* * * * *